July 15, 1969  G. B. JOLLEY  3,455,490
VOLUMETRIC METERING DEVICE FOR PARTICULATE SOLIDS
Filed July 18, 1967  2 Sheets-Sheet 1

G. B. JOLLEY  INVENTOR

BY Llewellyn A. Preston

PATENT ATTORNEY

July 15, 1969 G. B. JOLLEY 3,455,490
VOLUMETRIC METERING DEVICE FOR PARTICULATE SOLIDS
Filed July 18, 1967 2 Sheets-Sheet 2

G. B. JOLLEY  INVENTOR

BY

PATENT ATTORNEY

United States Patent Office 3,455,490
Patented July 15, 1969

3,455,490
VOLUMETRIC METERING DEVICE FOR
PARTICULATE SOLIDS
Gordon B. Jolley, Baton Rouge, La., assignor to Esso
Research and Engineering Company, a corporation of
Delaware
Filed July 18, 1967, Ser. No. 654,108
Int. Cl. G01f 11/24
U.S. Cl. 222—193                                13 Claims

ABSTRACT OF THE DISCLOSURE

This invention relates to apparatus for metering volumetric quantities of abrasive solids particles into various systems. In particular, it relates to apparatus for introducing particulate abrasive solids to pressurized systems, including those operated at elevated temperatures, e.g., fluidized iron ore reduction reactors. The metering apparatus comprises the general combination of a rotatable drum or paddle wheel journaled within an enclosing housing. The pressure between the housing and the system into which the solids are to be delivered is equalized. The drum is a cylindrical shaped member characterized by the presence of a plurality of individual blades or vanes spaced apart and extending perpendicularly from the drum surface, and side walls which extend at least to the terminal ends of the blades to provide individual receptacles or pockets for solids. The drum is located below a solids inlet and above a solids outlet leading, e.g., to a reactor. Solids pour from the inlet to the drum to fill the individual recesses, in seriatum, as the drum is rotated. A feature of the invention is that the distance between the path of the blades and the ore outlet is (a) greater than the maximum particle diameter, but (b) less than that which will provide an angle equal to or greater than that angle of repose of the solids which fill the individual recesses. In the operation, a drum recess is filled to a depth up to the angle of repose of the solids, and thence the flow ceases as the next empty recess is brought into position under the inlet and the filled recess is transported toward the outlet for discharge.

---

Various systems are known wherein it is desirable or essential to introduce very finely divided abrasive solids particles for further processing. In a fluidized iron ore reduction reactor, e.g., it is essential to meter particulate iron ore into a reactor in volumetric quantities to maintain proper processing conditions. In such reactors, finely divided iron ore, e.g., oxidic iron ore, must be elevated to the top of a reactor, introduced into the upper stage of a series wherein the ore is countercurrently contacted in individual beds by ascending fluidizing reducing gases. The individual beds are generally maintained at supra-atmospheric pressures ranging, e.g., from about 100 to about 200 pounds per square inch absolute and above and at elevated temperatures ranging generally from about 1000° F. to about 1800° F. and higher. The ore is progressively reduced upon descent from one stage of the series to the next to provide substantially metallic iron which is withdrawn from the final ferrous reduction stage.

Presently available apparatus is generally unacceptable for such usage. This is because of the requirement of operating at relatively high temperature and pressures, and the demand for continuous, uninterrupted constant feed volumes which impose heavy burdens. A major factor is due to the high wear caused by the abrasive action of the finely divided ore. Solids pack into close clearances and jam the feeders. Seals and bearings, in particular, are exposed to the abrasive action of the solids. The pressure of the gas forces ore solids into, e.g., the bearing shaft which disrupts the proper operation and damages the apparatus.

It is the primary objective of the present invention to obviate these and other difficulties. It is, specifically, an objective to accomplish these ends and to provide a volumetric metering device for introducing finely divided solids, especially abrasive solids, into various systems. In particular, it is an objective to provide particulate solids metering apparatus wherein there are no close clearances for binding between the component parts so as to cause wear, and no solids holdup in the pressure vessel in which the solids are introduced.

These and other objects are achieved in accordance with the present invention comprising, in combination, an enclosing wall defining a housing within which is journaled a rotatable drum containing recesses or pockets for conveying solids between a solids inlet located above the drum to a solids outlet located below the drum. In a preferred combination, particulate solids can be delivered to a pressurized system and the pressure between the housing and the pressurized system are equalized by use of a connecting line or conduit. The drum is a cylindrical shaped member, and its curved external surface is provided with a series of blades or vanes of generally rectangular shape which extend or project radially and preferably equidistantly outwardly from the drum surface. To each flat side of the drum, facing inwardly, is affixed circular shaped members forming walls which extend outwardly to the upper edges of the individual blades to form, with the blades, a series of rectangular shaped, trough-like, constant volume receptacles. Preferably, the blades are of equal size and spaced equidistant one from another along the curved drum surface. Solids pour from the inlet into the individual recesses. These are filled in seriatum, and the solids are conveyed from the inlet for feeding or metering through the outlet. Thus, in effect, solids pour from the inlet to the recesses which are successively filled as the drum is rotated via suitable means and, due to constant angular velocity of rotation, solids are delivered to a system at constant rate.

A feature of the invention is that the distance between the open end or terminus of the solids inlet and a receptacle or pocket on the drum surface is that (a) it is greater than the maximum particle diameter of the solids, but (b) sufficiently close to the drum surface for solids to pour into an aligned recess for limited filling of the recesses up to the angle of repose of the solids. The distance is essential because, on the one hand, if the distance is too close, e.g., the blade edges or the conduit, or both, will be abraded. On the other hand, if the distance is too great, particulate solids will overflow or spill from the recesses, this causing incipient fluidization of the particulate solids. Under this condition of operation, the flow of solids will be erratic or the solids will not feed.

Preferably, to prevent abrasion between surfaces, the distance between the terminus of the inlet and the blade edges ranges about 4 times the diameter of the largest solids particle. For oxidic iron ores, the distance is such that ore will pour into the recesses and fill them up to the angle of repose, this representing generally an angle ranging from about 30° to about 40°, and more generally from about 35° to about 40°.

To prevent abrasion, the distance between the outer surfaces of the side walls defining the drum and the inside walls defining the housing within which the drum turns is also greater than the maximum diameter of the largest particle. Preferably, this distance is also about 4 times the maximum particle diameter. In the combination, abrasion is also drastically reduced by a design which eliminates immersion of the drum within the abrasive solids. The packing glands and bearings also are located outside the housing walls and, because the pressure between the housing and the reactor is equalized, there is little or no tendency of the particulate solids to flow into the parts within which the drum is journaled.

These and other features, and advantages, will be understood by reference to the following detailed description, and to the drawings to which reference is made in the description.

Figure 1:
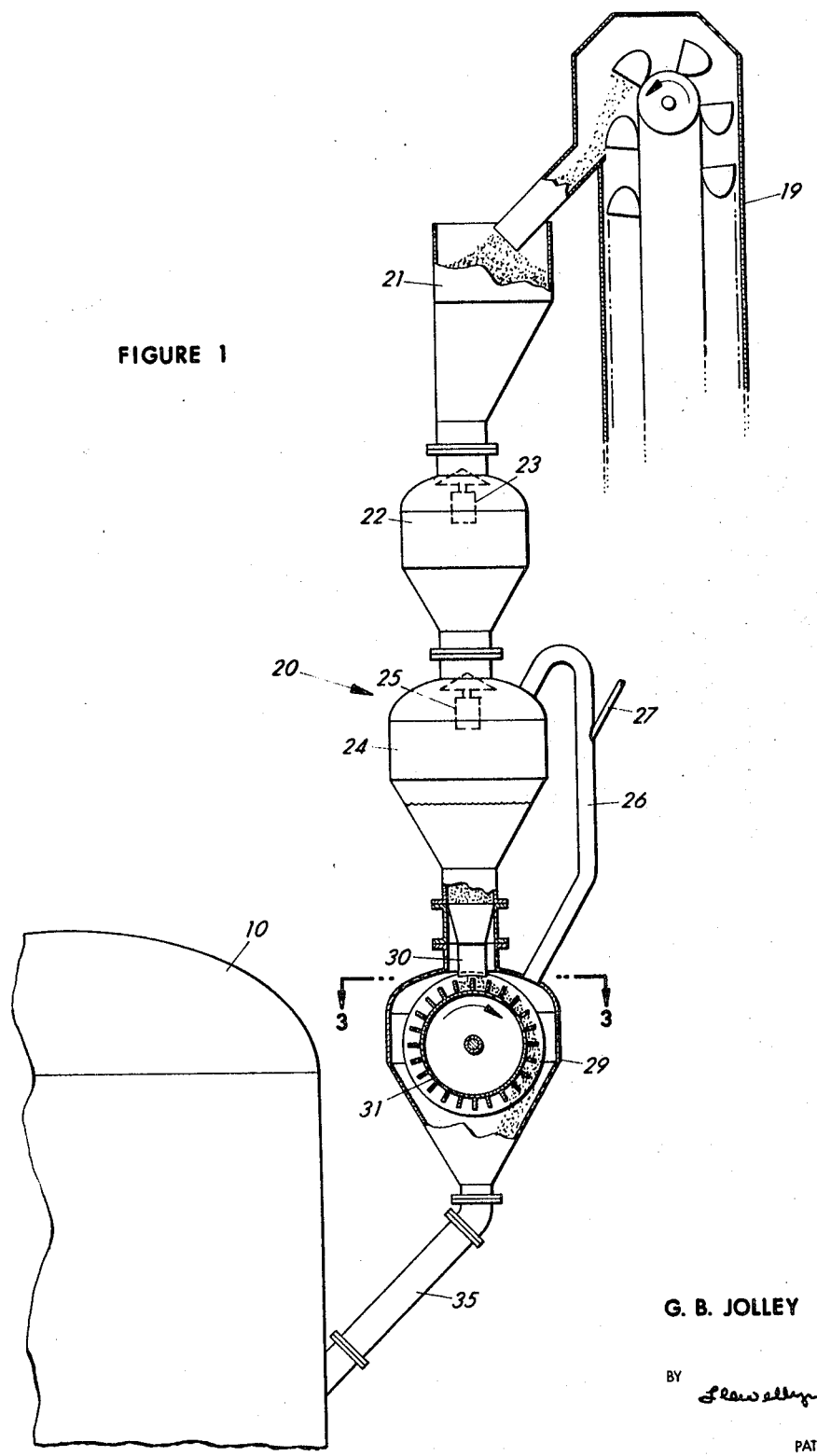
FIGURE 1 is a side elevation view of a preferred drum volumetric metering device, especially of an embodiment or drum-housing combination for metering particulate iron ore solids into a pressurized reactor.

Referring to FIGURE 1 is shown generally a reactor 10 and a volumetric metering system 20 for introducing particulate iron ore solids to the reactor. Ore is conveyed to the top of reactor 10, e.g., via a bucket elevator 19 and introduced to reactor 10 via the volumetric metering system 20.

The reactor 10 provides a series of fluidized beds or stages, the upper or first of which is often a low-temperature preheat stage wherein little or no reduction takes place. Often, also, gases are combusted within this stage to provide process heat. In any event, ore is introduced into the first stage and flowed downwardly from one stage to the next via standpipes (not shown), and within the individual fluidized beds the ore is progressively reduced from, e.g., ferric oxide to magnetic oxide of iron, thence to ferrous oxide, and finally to substantially metallic iron. Reducing gas is introduced into the bottom of reactor 10 with makeup gas or regenerated gas, or both, as desired.

A preferred volumetric metering system for feeding ore at substantially atmospheric pressure into a reactor 10 operated at supra-atmospheric pressure comprises a series of hoppers 21, 22, 24, 29, interconnected one to another via suitable flange connections. Ore is introduced at substantially atmospheric pressure into an open hopper 21, which is generally maintained in filled condition. Ore from hopper 21 is discharged via suitable valve means 23 to the connecting closed hopper 22 from whence it is introduced via suitable valve means 25 into the pressurized connecting hopper 24. The pressure within hopper 24 is maintained in equilibrium with hopper 29 and reactor 10 by virtue of an open line or equilibrium line 26 which connects hopper 24 with the drum metering device 29. The latter hopper 29 is, in turn, maintained at the pressure of reactor 10 via use of an oversized line 35 which also serves as a conduit for introduction of the ore into the reactor. A purge line 27 is provided in line 26 to prevent blockage by solids.

In operation, particulate ore at atmospheric pressure pours from hopper 21 into the hopper 22 via valve 23, and thence is immediately discharged to hopper 24 via valve 25. The pressure within hopper 22 varies between atmospheric and reactor pressure, while the latter hopper 24 (and hopper 29), as indicated, is maintained at reactor pressure.

Figure 2:
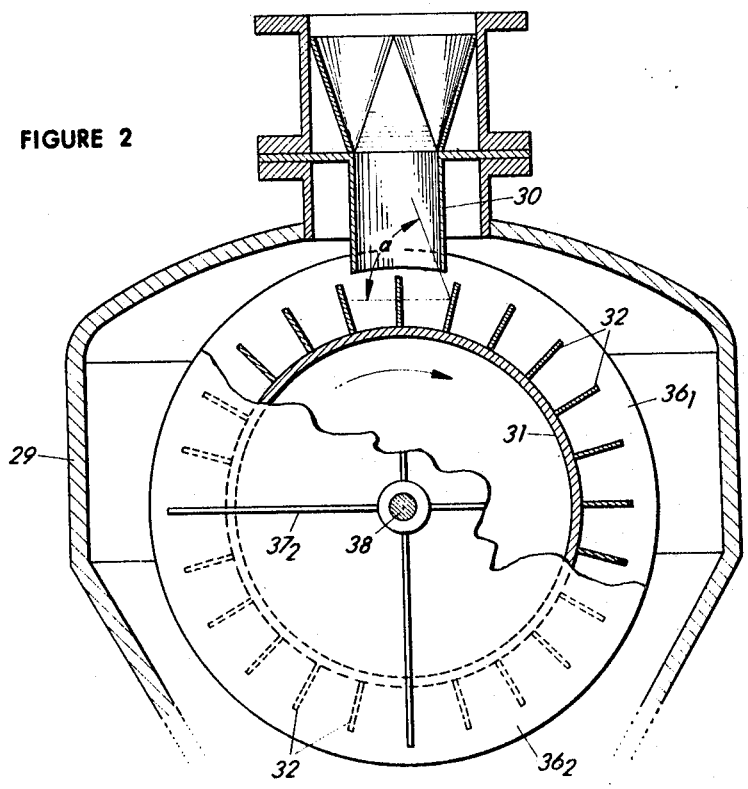
FIGURE 2 is an enlarged fragmentary view taken from the foregoing figure showing the critical dimension between the terminal open end of the ore inlet and blade edges (or path thereof) located or mounted upon the drum surface.

The ore within hopper 24 is maintained at a suitable level and is metered into reactor 10 by rotation of wheel 31 via suitable motor means 36. Ore pours through the ore inlet or chute 30 onto the drum surface and into a recess located below the inlet. It will be observed, particularly by reference to FIGURE 2, that the individual (relatively shallow) recesses between any pair of blades 31 are sequentially filled with ore up to a certain critical level which is less than or equal to the angle of repose of the particular solids. Thus, a distance is provided between the upper edges of the blades 32 and the terminal end of the chute 30 so that the angle of repose of the piled solids is never exceeded. In the preferred operation, as an empty recess moves into filling position below chute 30, ore begins to flow into the recess. The flow continues, the angle α between a line along the surface of the pile and horizontal gradually increasing until the angle is equal to the angle of repose of the solids. The flow then ceases. Thus, the distance between the drum 31 is such that the blades 32 extend sufficiently far outwardly that solids cannot overflow the edges of the blades as the angle of repose is reached. The flow into a recess therefore must cease. For rapid filling, the recesses or pockets should be of greater width in the direction lying parallel to the axis of the drum 31 than in the direction perpendicular thereto. The dimensions of the ore inlet or chute 30 preferably also conform to this configuration.

A feature of this design also is that the power requirements are very low. Thus, as ore fills the recesses of the rotating drum 31 the weight of the solids tends to produce or continue the rotation which feeds the solids to the outlet 35. The drum 31 is thus activated by the solids much as a water wheel used for power generation.

In its preferred form also, the equipment is sized so that drum 31 is rotated, preferably at angular velocities which provide peripheral velocities ranging up to about 100 inches per minute, the angular velocities ranging from about 1 to about 30 revolutions per minute, and preferably from about 1 to about 4 revolutions per minute. In accordance therewith, incipient fluidization is minimized.

Figure 3:
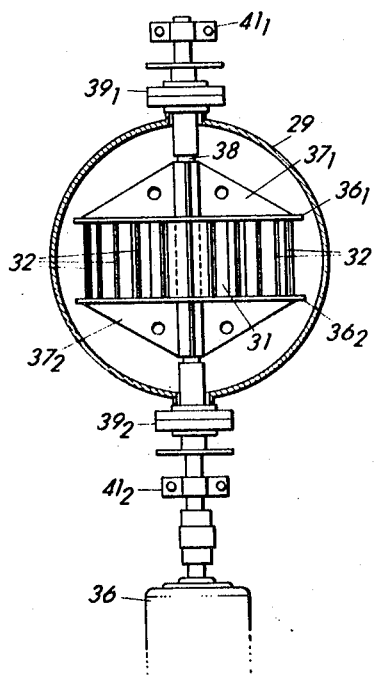
FIGURE 3 is a plan view taken along lines 3—3, showing location of the packing glands and bearing supports outside the housing, and the spacing between the outer surfaces of the drum and the inner walls of the housing.

The drum 31 is mounted on an axle 38, of relatively long length, journaled within and extending through the surrounding walls forming the hopper 29 (FIGURE 3). Stiffening members $37_1$, $37_2$ are provided to aid in the support of the axle 38, these being affixed to the walls $36_1$, $36_2$ which turn with and are a part of the drum 31. Packing glands $39_1$, $39_2$ are located outside the housing, and the axle 38 is supported on bearing supports $41_1$, $41_2$. The drum 31 is rotated on the axle 38 via motor means 36.

It will be observed that considerable space is provided between the rotating drum 31 and the walls of hopper 29. Clearances are provided which are greater than the maximum particle size of the solids. Spilled solids flow downwardly along the side walls of hopper 29 to enter the outlet 35. Thus, a feature of the design is that drum 31 is never immersed in solids.

It is apparent that various modifications and changes can be made without departing the spirit and scope of the invention.

What is claimed is:

1. In a reactor wherein particulate oxidic iron ore abrasive solids are fluidized by contact with an ascending gas while volumetric quantities of the said particulate abrasive solids are metered into the reactor, the combination comprising a reactor, and volumetric metering apparatus, wherein is included
a pair of interconnected hoppers, a first and second hopper both mounted above the reactor, the first hopper being mounted above the second hopper,
the first hopper including an enclosing wall defining a housing,
a valved inlet for maintaining an internal pressure and for receiving solids introduced therethrough into the said hopper,
an inlet to the second hopper for discharging solids from the said first hopper to the second hopper,
a pressure equilibrium line communicating said first and second hoppers,
said second hopper including an enclosing wall defining a housing,
a rotary drum mounted on an axis extending through the housing,
blades extending perpendicularly from the curved drum surface, and side walls which extend beyond the drum surface and perpendicular to the outer edges of the blades to form individual shallow recesses for collecting, in seriatum, particulate oxidic iron ore abrasive solids which are fed via the inlet from the first to the second hopper into the recesses as the drum is rotated, the terminus of said inlet from the first to the second hopper being located at a distance greater than the maximum particle diameter of the solids away from the path of the blades to provide blade clearance on rotation of the drum, but sufficiently close to the blades for solids to pour into an aligned recess for limited filling to a depth up to the angle of repose of the piled solids without overflow from the recess, an outlet located below the drum communicating said hopper with the reactor for conveying particulate solids to the reactor, and means for continuously rotating the drum to meter solids into the reactor.

2. The apparatus of claim 1 wherein the blades on the drum surface are of substantially equal size and located equidistant one from another.

3. The apparatus of claim 1 wherein the distance between the terminus of the solids inlet to the second hopper, and the path of the blades ranges at least about 4 times the maximum diameter of the solids particles.

4. The apparatus of claim 1 wherein the drum recesses are of greater width in the direction lying parallel to the axis of the drum than in a direction perpendicular thereto.

5. The apparatus of claim 1 wherein the inlet into the reactor is of greater width in the direction parallel to the axis of the drum than in a direction perpendicular thereto.

6. The apparatus of claim 1 wherein, in the second hopper, clearances greater than the maximum diameter of the particulate solids are provided between the housing and the rotating drum, and overflow solids flow freely downwardly along the housing walls to the outlet to the reactor so that the drum is never emersed in solids.

7. The apparatus of claim 6 wherein the clearance on either side of the drum is at least four times greater than the maximum particle diameter of the solids.

8. The apparatus of claim 1 wherein the distance between the terminus of the open-end conduit and the path of the blades is such as to define, for piled oxidic iron ores, an angle of repose ranging from about 30° to about 40°.

9. The apparatus of claim 8 wherein the angle of repose ranges from about 35° to about 40°.

10. The combination of claim 1 wherein an additional pair of interconnected hoppers are mounted one above the other, the pair being serially communicated via suitable valve means to said first hopper for passage of solids thereto, said pair including an open hopper for receiving solids for passage to the adjacent closed hopper of the series.

11. The apparatus combination of claim 10 wherein the adjacent closed hopper of the pair is operated at a pressure intermediate atmospheric and that of the hopper to which it is joined in direct communication.

12. The apparatus of claim 1 wherein the drum is rotated at angular velocities which provide peripheral velocities ranging up to about 100 inches per minute, and angular velocities ranging from about 1 to about 30 revolutions per minute.

13. The apparatus of claim 12 wherein the drum is rotated at angular velocities ranging from about 1 to about 4 revolutions per minute.

References Cited

UNITED STATES PATENTS

| | | | |
|---|---|---|---|
| 524,900 | 8/1894 | James | 222—442 |
| 798,881 | 9/1905 | Cranford | 222—368 |
| 1,060,804 | 5/1913 | Wiebe | 222—368 |
| 2,663,465 | 12/1953 | Hogin | 222—368 |
| 2,723,057 | 11/1955 | Golden | 222—442 |
| 3,093,267 | 6/1963 | Lowery | 222—442 |

WALTER SOBIN, Primary Examiner

U.S. Cl. X.R.

222—353, 368, 442, 450